US011603071B2

United States Patent
Higuchi et al.

(10) Patent No.: US 11,603,071 B2
(45) Date of Patent: Mar. 14, 2023

(54) VEHICULAR AIRBAG WIND-UP DEVICE

(71) Applicant: TOYOTA BOSHOKU KABUSHIKI KAISHA, Aichi-ken (JP)

(72) Inventors: Yasuhito Higuchi, Aichi-ken (JP);
Makoto Sotokawauchi, Aichi-ken (JP);
Masato Morii, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/706,147

(22) Filed: Mar. 28, 2022

(65) Prior Publication Data
US 2022/0332277 A1 Oct. 20, 2022

(30) Foreign Application Priority Data
Apr. 19, 2021 (JP) .............................. JP2021-070336

(51) Int. Cl.
*B60R 21/237* (2006.01)
*B60R 21/232* (2011.01)

(52) U.S. Cl.
CPC .......... *B60R 21/237* (2013.01); *B60R 21/232* (2013.01); *B60R 2021/2375* (2013.01)

(58) Field of Classification Search
CPC ................ B60R 21/237; B60R 21/232; B60R 2021/2375; B65B 63/04
USPC ............................. 280/730.1, 730.2; 493/454
See application file for complete search history.

(56) References Cited

U.S. PATENT DOCUMENTS

| 7,568,725 B2 * | 8/2009 | Komiyama ......... B60R 21/2338 |
| | | 280/730.2 |
| 9,896,057 B2 * | 2/2018 | Fischer ............. B60R 21/23138 |
| 2014/0054879 A1 * | 2/2014 | Taguchi ................ B60R 21/237 |
| | | 280/730.2 |

FOREIGN PATENT DOCUMENTS

| GB | 2364970 A * | 2/2002 | ........... B60R 21/237 |
| JP | 2014-24440 | 2/2014 | |

* cited by examiner

*Primary Examiner* — Keith J Frisby
(74) *Attorney, Agent, or Firm* — Greenblum & Bernstein, P.L.C.

(57) ABSTRACT

A wind-up device for winding up a vehicular airbag includes a base, a bar, and a first movable member. The base has an elongated plate shape extending in a first direction and includes a housing section that extends in the first direction. The vehicular airbag is placed on the base. The bar is disposed in the housing section and has a center axis extending in the first direction. The bar is rotatable around the center axis and includes a groove that extends in the first direction and is recessed from an outer surface of the bar toward the center axis. The first movable member extends in the first direction along the bar and is movable to be closer to the bar. The first movable member includes an insertion section that is to be inserted into the groove together with a portion of the airbag that is above the housing section.

11 Claims, 10 Drawing Sheets

VEHICULAR AIRBAG WIND-UP DEVICE

CROSS REFERENCE TO RELATED APPLICATION

This application claims priority from Japanese Patent Application No. 2021-70336 filed on Apr. 19, 2021. The entire contents of the priority application are incorporated herein by reference.

TECHNICAL FIELD

The technology described herein relates to a vehicular airbag wind-up device.

BACKGROUND

In one method of folding a vehicular airbag, a jig is used in folding the airbag. The jig, which is a long flat plate, is put on the airbag and the airbag is folded and wound around the jig.

However, in such a method, the airbag may be moved from a correct position or wrinkled when the airbag is folded and wound around the jig. The airbag may not be folded and wound around the jig properly. The airbag usually has a great length measuring in an axial direction of the jig and may be folded and wound around the jig by multiple operators. In such a case, the appropriate performance of folding and winding the airbag is quite difficult.

SUMMARY

The technology described herein was made in view of the foregoing circumstances. An object is to provide a vehicular airbag wind-up device that winds up an airbag properly and easily.

The present disclosure is related to a wind-up device for winding up a vehicular airbag and the wind-up device includes a base having an elongated plate shape that extends in a first direction, a bar, and a first movable member. The base includes a housing section that extends in the first direction and the vehicular airbag is placed on the base. The bar is disposed in the housing section. The bar has a center axis that extends in the first direction and is rotatable around the center axis. The bar includes a groove that extends in the first direction and is recessed from an outer surface of the bar toward the center axis. The first movable member extends in the first direction along the bar and is movable to be closer to the bar. The first movable member includes an insertion section that is to be inserted into the groove together with a portion of the airbag that is above the housing section.

DETAILED DESCRIPTION

One embodiment of the present disclosure will be described in detail with reference to FIGS. 1 to 10. A wind-up device 1 for winding up an airbag 8 (a vehicular airbag) that is to be installed in an automobile (a vehicle) will be described. An arrow directions F, B, U, D, L, R represent a front direction, a rear direction, an upper direction, a lower direction, a left direction (one direction), and a right direction, respectively. The right side, the left side, and the front side on each sheet of FIGS. 3 to 9 represent a front side, a rear side, and a left side, respectively.

Figure 1:
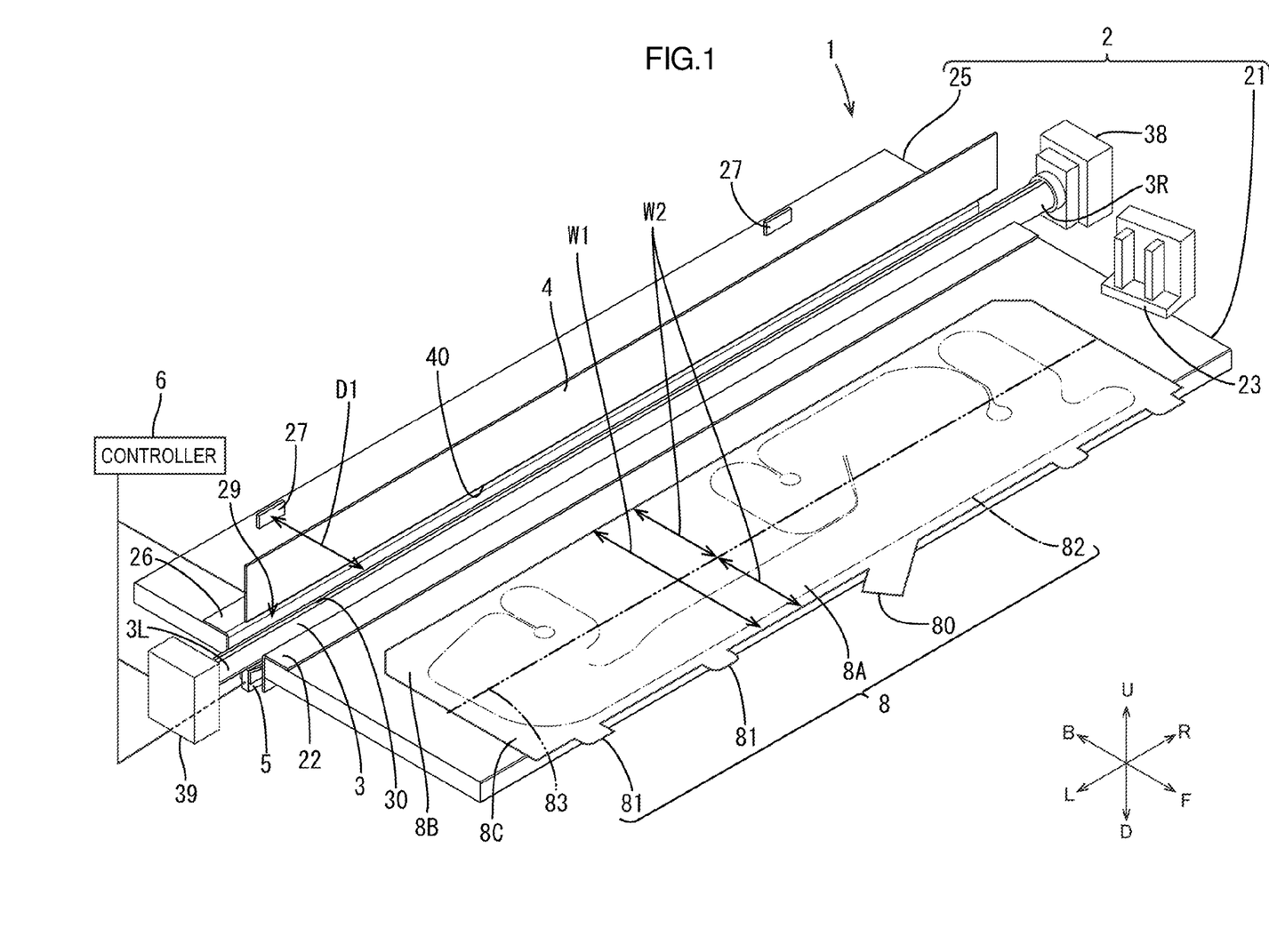
FIG. 1 is a perspective view of a wind-up device according to one embodiment.

As illustrated in FIG. 1, the wind-up device 1 includes a base 2 having a rectangular shape elongated in the right-left direction (a first direction). The base 2 includes a first base member 21 and a second base member 25 that are plate members. The first base member 21 and the second base member 25 are arranged such that upper plate surfaces extend horizontally and face upward. The first base member 21 and the second base member 25 are elongated in a right-left direction and have a rectangular plan view shape. The first base member 21 is arranged in a front section of the wind-up device 1 and the second base member 25 is arranged in a rear section. The airbag 8 is placed on the upper surfaces of the first base member 21 and the second base member 25.

The airbag 8 is a curtain airbag that is installed on a ceiling of a vehicle and can be inflated to cover a window glass. The airbag 8 is an OPW (one-piece woven) airbag. The airbag 8 has a rectangular shape having about 2 m in a length measuring in the right-left direction (the first direction) and about 570 mm in a length measuring in the front-rear direction (a second direction). As illustrated in FIG. 1, the airbag 8 includes a body section 8A, an inlet section 80, installation sections 81, and a bag section 82. The inlet section 80 and the installation sections 81 extend from a front long edge of the body section 8A. Gas created by an inflator flows through the inlet section 80 into the bag section 82 and the gas is stored in the bag section 82 and inflates the bag section 82.

The airbag 8 is installed on the ceiling of the vehicle with the installation sections 81. The front long edge of the body section 8A extends along the ceiling when the airbag 8 is installed in the vehicle. As illustrated in FIG. 1, a center line 83 of the airbag 8 relative to a short side direction (the front-rear direction, the second direction) of the airbag 8 is represented by a two-dotted chain line. A section of the airbag 8 including the center line 83 is a middle section and the center line 83 is away from the long front edge or a long rear edge by 285 mm. As illustrated in FIG. 1, the airbag 8 is defined in a rear section 8B and a front section 8C by the center line 83. The airbag 8 has a width W1 measuring in a short-side direction (the second direction) that is perpendicular to a long-side direction (the first direction) of the airbag 8. A half of the width W1 is a distance W2 from the long front edge or the long rear edge to the center line 83.

Figure 3:
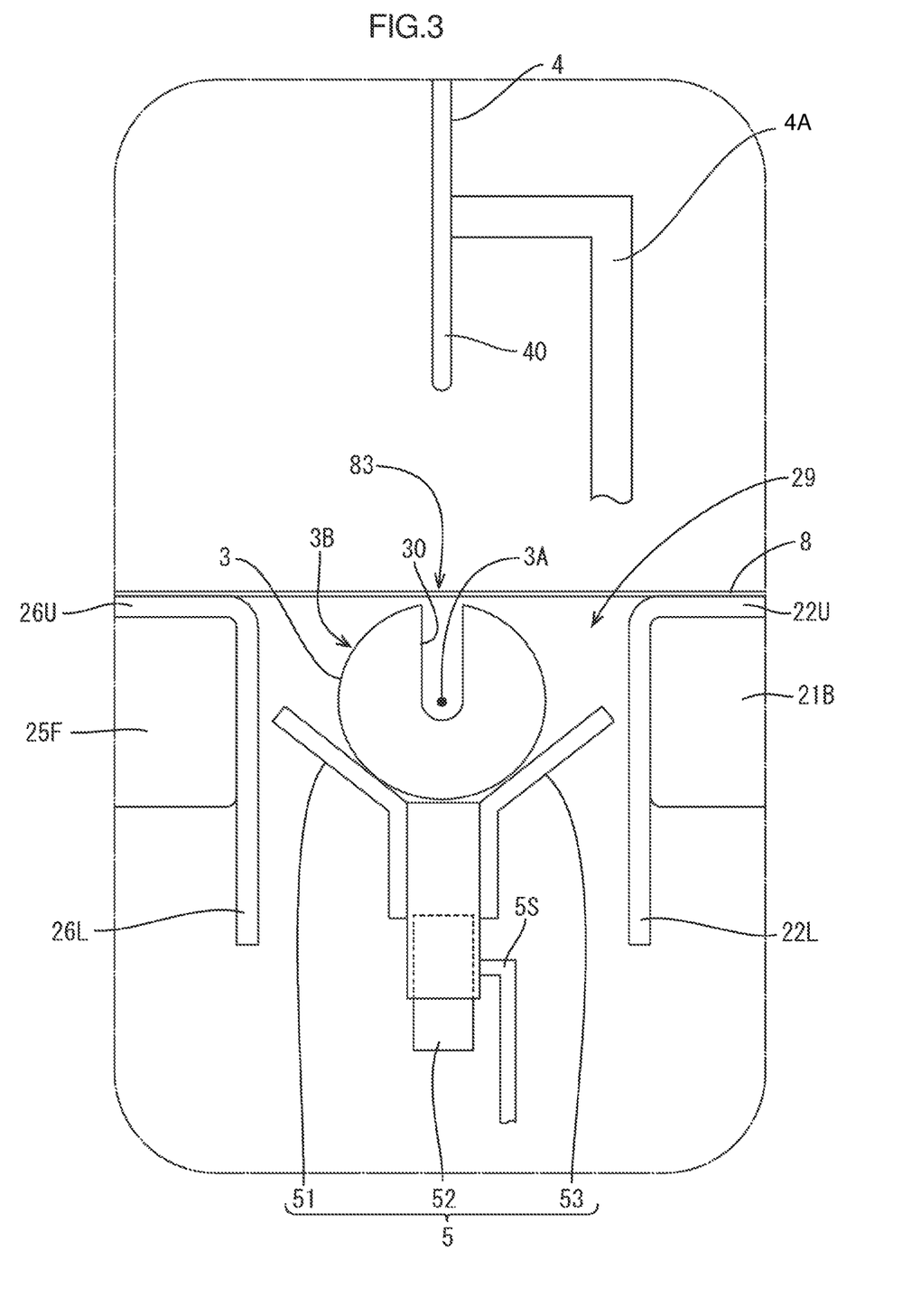
FIG. 3 is a side view of a portion of the wind-up device including a bar in a housing section.

As illustrated in FIGS. 1 and 3, the wind-up device 1 further includes a first cover 22 and a clamp 23. The rear edge portion 21B of the first base member 21 is covered with the first cover 22 and the clamp 23 is mounted on a right short edge of the first base member 21. The first cover 22 is made from a metal plate that is bent to an L-shape and includes an upper portion 22U and a lower portion 22L. The upper portion 22U and the lower portion 22L cover an upper surface and a rear edge surface of the rear edge portion 21B, respectively. The lower portion 22L projects downward further from a lower surface of the first base member 21. The first cover 22 extends along the rear edge portion 21B in the longitudinal direction of the first base member 21 (the right-left direction, the first direction).

As illustrated in FIGS. 1 and 3, the wind-up device 1 further includes a second cover 26 and positioning members 27. The front edge portion 25F of the second base member 25 is covered with the second cover 26 and the positioning members 27 are near the long rear edge of the second base member 25. The second cover 26 is made from a metal plate that is bent to an L-shape and includes an upper portion 26U and a lower portion 26L. The upper portion 26U and the lower portion 26L cover an upper surface and a front edge surface of the front edge portion 25F, respectively. The lower portion 26L projects downward further from a lower surface of the second base member 25. The second cover 26 extends along the front edge portion 25F in the longitudinal direction of the second base member 25 (the right-left direction). The first cover 22 and the second cover 26 are arranged such that the lower portion 22L and the lower portion 26L are opposed to each other.

Figure 2:
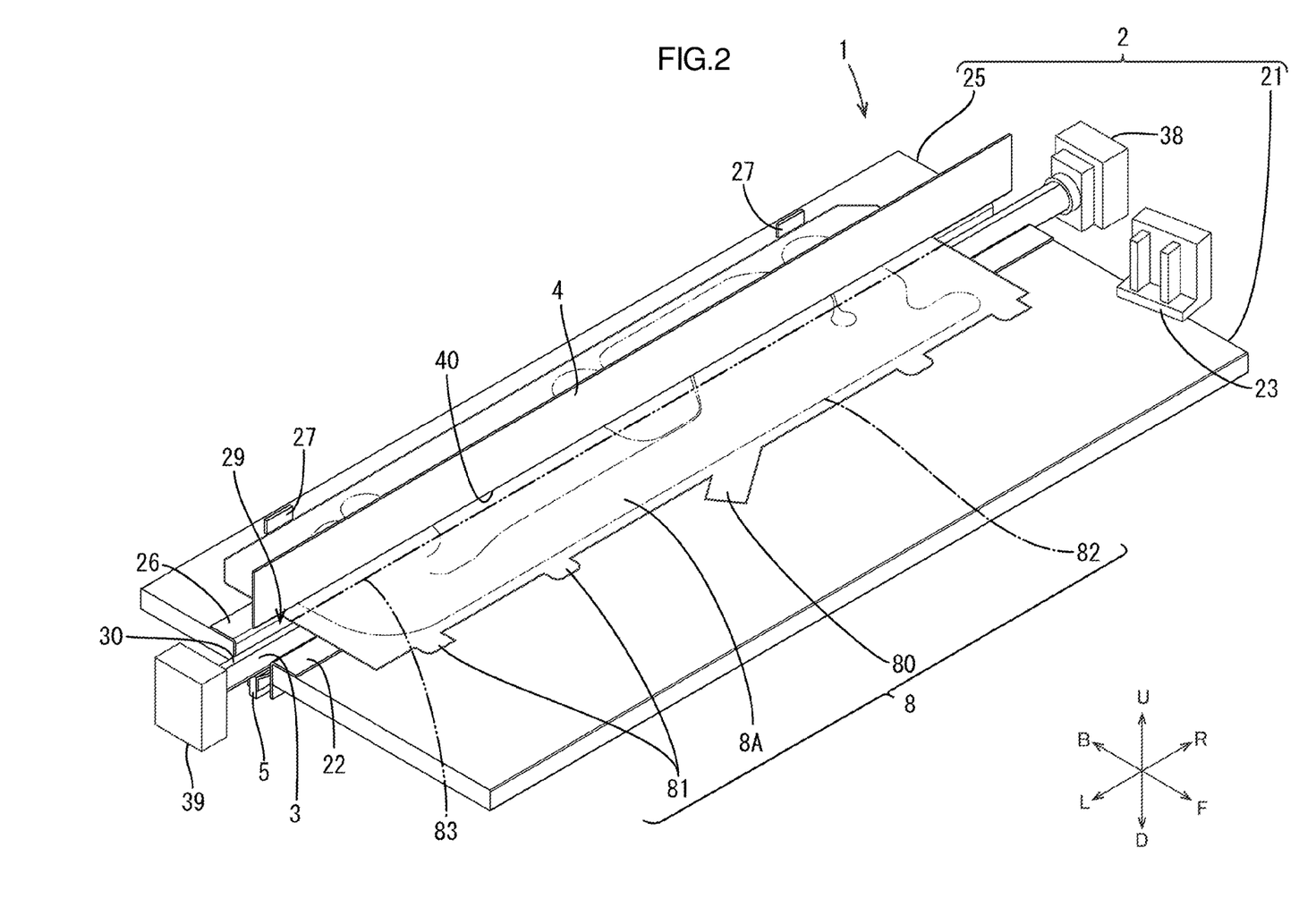
FIG. 2 is a perspective view of the wind-up device in which an airbag is placed on a base.

As illustrated in FIGS. 1 and 2, the positioning members 27 project upward from the second base member 25. When the airbag 8 is placed on the base 2 and the rear long edge of the airbag 8 is contacted with the positioning members 27, the center line 83 of the airbag 8 is above an opening of a housing section 29.

As illustrated in FIGS. 1 and 3, the first cover 22, the rear edge portion 21B, the second cover 26, and the front edge portion 25F are configured as the housing section 29. The housing section 29 has a space between the first cover 22 and the second cover 26 and extends in the longitudinal direction (the first direction). The housing section 29 has a through hole that is through vertically and has an upper opening and a lower opening. A bar 3 is disposed in the space of the housing section 29 and is between the first cover 22 and the second cover 26. The bar 3 has an elongated circular columnar shape extending in the longitudinal direction and has a center axis 3A. As illustrated in FIG. 3, the bar 3 is disposed in the housing section 29 such that the center axis 3A of the bar 3 extends in the longitudinal direction of the base 2.

A diameter of the bar 3 decreases as it extends from a right end 3R toward a left end 3L in the axial direction. The diameter of the bar 3 at the right end 3R is 16 mm and that of the bar 3 at the left end 3L is 14 mm. The right end 3R and the left end 3L of the bar 3 are supported by a right support portion 38 and a left support portion 39, respectively. The left support portion 39 that supports the left end 3L includes a motor therein and the bar 3 can rotate around the center axis 3A via the motor. The rotation of the bar 3 is controlled by a controller 6 that is electrically connected to the left support portion 39.

An alloy including iron as a main component is preferably used for the material of the bar 3. Stainless is more preferable for the material of the bar 3 and SUS303 defined by JIS standard is much more preferable. A surface 3B of the bar 3 may be rubbed with a sandpaper. A sandpaper of a number greater than 300 is preferably used. After rubbing with the sandpaper, the surface 3B of the bar 3 may be subjected to metal plating and may be covered with metal. In metal plating, nickel-based metal or fluorine resin may be used. The surface 3B of the bar 3 covered with metal is less likely to be rusted. According to such a configuration, the airbag 8 is properly wound around the bar 3 and the airbag 8 that is wound around the bar 3 can be separated from the bar 3 smoothly after completion of the winding of the airbag 8.

As illustrated in FIG. 3, the bar 3 includes a groove 30 that is recessed from the surface 3B toward the center axis 3A. As illustrated in FIG. 1, the groove 30 extends in the longitudinal direction (the first direction) of the bar 3. The groove 30 includes opposing surfaces that are opposite each other and has a width between the opposing surfaces. The width of the groove 30 is four times a thickness of an insertion section 40 or more. The width of the groove 30 is preferably five times the thickness of the insertion section 40 or more. The width of the groove 30 is more preferably seven times the thickness of the insertion section 40 or less and much more preferably six times the thickness of the insertion section 40 or less. The width of the groove 30 is much more preferably 5.5 times the thickness of the insertion section 40. With the width of the groove 30 being in the range defined above, the middle section of the airbag 8 including and extending along the center line 83 is pushed into the groove 30 by the insertion section 40 properly. This suppresses the middle section of the airbag 8 from coming out of the groove 30 when the bar 3 is rotated. The thickness of the insertion section 40 is 1 mm and the width of the groove 30 is 5.5 mm. A depth of the groove 30 measuring in a radial direction of the bar 30 is 10 mm. The depth of the groove 30 is a dimension from the surface 3B toward the center axis 3A. In this embodiment, the depth of the groove 30 is greater than a dimension from the surface 3B to the center axis 3A, which is a radius of the bar 3. According to such a configuration, the middle section having a sufficient length is inserted in the groove 30 and the middle section of the airbag 8 is less likely to come out of the groove 30 when the airbag 8 is wound around the bar 3.

The bar 3 is arranged in the housing section 29 such that a distance D1 (refer to FIG. 1) from the groove 30 to the positioning member 27 is equal to the distance W2 from the long front edge or the long rear edge to the center line 83. Specifically, the distance D1 is from the center axis 3A to the positioning member 27 and is 285 mm According to such a configuration, the airbag 8 is arranged on the base 2 such that the center line 83 overlaps the center axis 3A.

Figure 4:
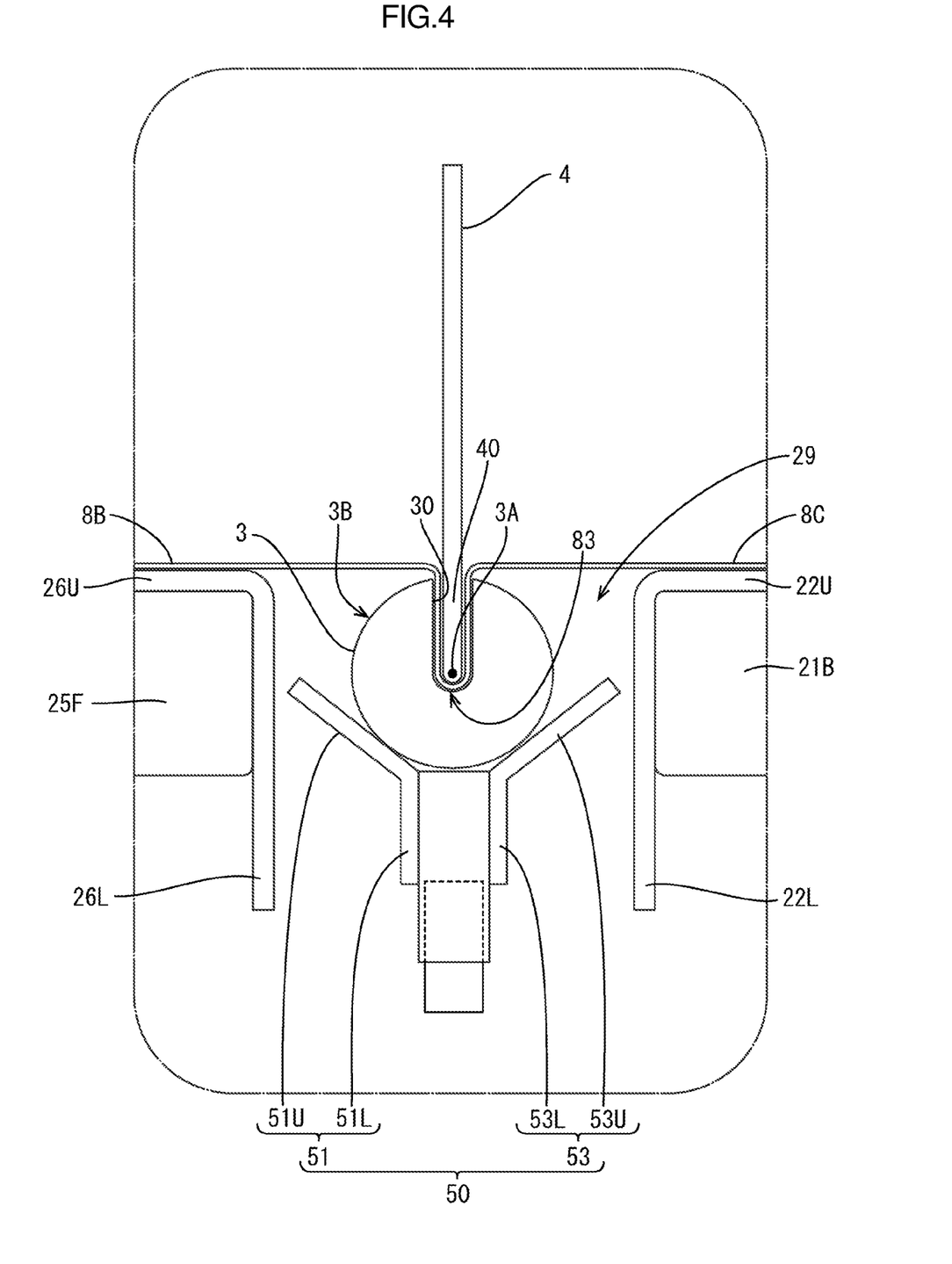
FIG. 4 is a side view of the portion of the wind-up device in which an insertion section is in a groove of the bar.

As illustrated in FIGS. 1 and 3, the wind-up device 1 includes an upper movable member 4 (a first movable member) just above the bar 3 or just above the housing section 29. The upper movable member 4 extends in the longitudinal direction (the first direction) along the bar 3 and is a rectangular plate member. As illustrated in FIG. 3, the upper movable member 4 is supported by a support member 4A so as to be movable up and down. The support member 4A is not illustrated in other drawings. The upper movable member 4 is moved up and down by a device electrically connected to the controller 6. The upper movable member 4 is moved downward to be closer to the bar 3. A distal end section, which is a lower section, of the upper movable member 4 is the insertion section 40. The insertion section 40 extends in the longitudinal direction (the first direction) of the groove 30 just above the groove 30. The insertion section 40 is the same as or greater in a length measuring in the longitudinal direction (the first direction) than the airbag 8. As illustrated in FIG. 4, the upper movable member 4 is moved downward to be closer to the bar 3 and the insertion section 40 is inserted in the groove 30 until a distal end of the insertion section reaches the center axis 3A of the bar 3 or reaches the bottom of the groove 30.

As illustrated in FIGS. 1 and 3, the wind-up device 1 includes a lower movable member 5 (a second movable member) just below the bar 3. The lower movable member 5 is on an opposite side from the upper movable member 4 with respect to the bar 3. The lower movable member 5 extends in the longitudinal direction of the bar 3. As illustrated in FIG. 3, the lower movable member 5 is supported by a support member 5S so as to be movable up and down. The lower movable member 5 is moved up and down by a device electrically connected to the controller 6. The lower movable member 5 is moved downward to be away from the bar 3.

As illustrated in FIGS. 3 and 4, the lower movable member 5 includes a guide 50 that includes a front guide 51 and a rear guide 53, and an urging member 52. The front and rear guides 51, 53 extend in the longitudinal direction of the bar 3. The urging member 52 urges the front and rear guides 51, 53 upward and toward the bar 3. The front and rear guides 51, 53 receives the bar 3 from below. Lower portions 51L, 53L of the front and rear guides 51, 53 extend vertically parallel to the lower portions 26L, 22L, respectively. An upper portion 51U of the front guide 51 extends upward and obliquely toward the lower portion 26L from the lower portion 51L of the front guide 51. An upper portion 53U of the rear guide 53 extends upward and obliquely toward the lower portion 22L from the lower portion 53L of the rear guide 53. Thus, the upper portions 51U, 53U of the front guide 51 and the rear guide 53 extend farther away from each other as they extend upward and obliquely toward the lower portions 26L, 22L, respectively. The urging member 52 includes an elastic member such as a spring therein and urges the front guide 51 and the rear guide 53 upward.

As illustrated in FIG. 1, the wind-up device 1 includes the right support portion 38, the left support portion 39, and the controller 6. The right support portion 38 and the left support portion 39 support the bar 3. The controller 6 is electrically connected to the devices that move the upper movable member 4 and the lower movable member 5, respectively. The controller 6 is configured to control the rotation of the bar 3 around the center axis 3A, the movement of the upper movable member 4 and the movement of the lower movable member 5 relative to the bar 3.

Next, a method of winding up the airbag 8 with the wind-up device 1 will be described. First, as illustrated in FIG. 1, the airbag 8 is placed on the upper surface of the first base member 21 such that the inlet section 80 and the installation sections 81 are disposed on the front side. Then, as illustrated in FIG. 2, the airbag 8 is moved rearward through a space between the upper movable member 4 and the bar 3 until the airbag 8 comes in contact with the positioning members 27. As illustrated in FIG. 3, the airbag 8 is placed on the first base member 21 and the second base member 25 such that the center line 83 of the airbag 8 is just above the housing section 29 or the groove 30. The insertion portion 40 of the upper movable member 4 is just above the center line 83.

The bar 3 is supported by the right support portion 38 and the left support portion 39 such that the groove 30 opens upward. When the bar 3 is positioned such that the groove 30 opens upward as illustrated in FIG. 3, the bar 3 is in an initial state. When the bar 3 is supported by the right support portion 38 and the left support portion 39, the surface 3B at an uppermost level is on a substantially same level as the upper surface of the base 2. According to such a configuration, the bar 3 is on the same level as the upper surface of the base 2. Therefore, when the airbag 8 is placed on the base 2 with covering the groove 30, wrinkles are less likely to be caused on the airbag 8 and the middle section of the airbag 8 is properly inserted in the groove 30. The lower movable member 5 is positioned such that the front guide 51 and the rear guide 53 are in contact with the surface 3B of the bar 3. The front guide 51 and the rear guide 53 may be away from the surface 3B with a small distance.

In the above state illustrated in FIG. 3, the controller 6 controls the upper movable member 4 to move downward to be closer to the bar 3. The controller 6 controls the upper movable member 4 to move downward until the insertion section 40 comes in contact with the middle section including the center line 83 of the airbag 8 and further move downward until the insertion section 40 and the middle section of the airbag 8 are inserted into the groove 30. As illustrated in FIG. 4, the controller 6 controls the upper movable member 4 to move downward until a distal end of the insertion section 40 is lower than the center axis 3A of the bar 3. The insertion section 40 and the middle section of the airbag 8 are disposed in the groove 30. The middle section of the airbag 8 includes a portion of the front section 8C and a portion of the rear section 8B.

Since the insertion section 40 is the same as or greater than the airbag 8 in the length measuring in the longitudinal direction, the middle section of the airbag 8 can be pressed down by the insertion section 40 with uniform pressing force in the longitudinal direction. Therefore, the middle section of the airbag 8 is pushed into the groove 30 correctly and wrinkles are less likely to be caused.

Figure 5:
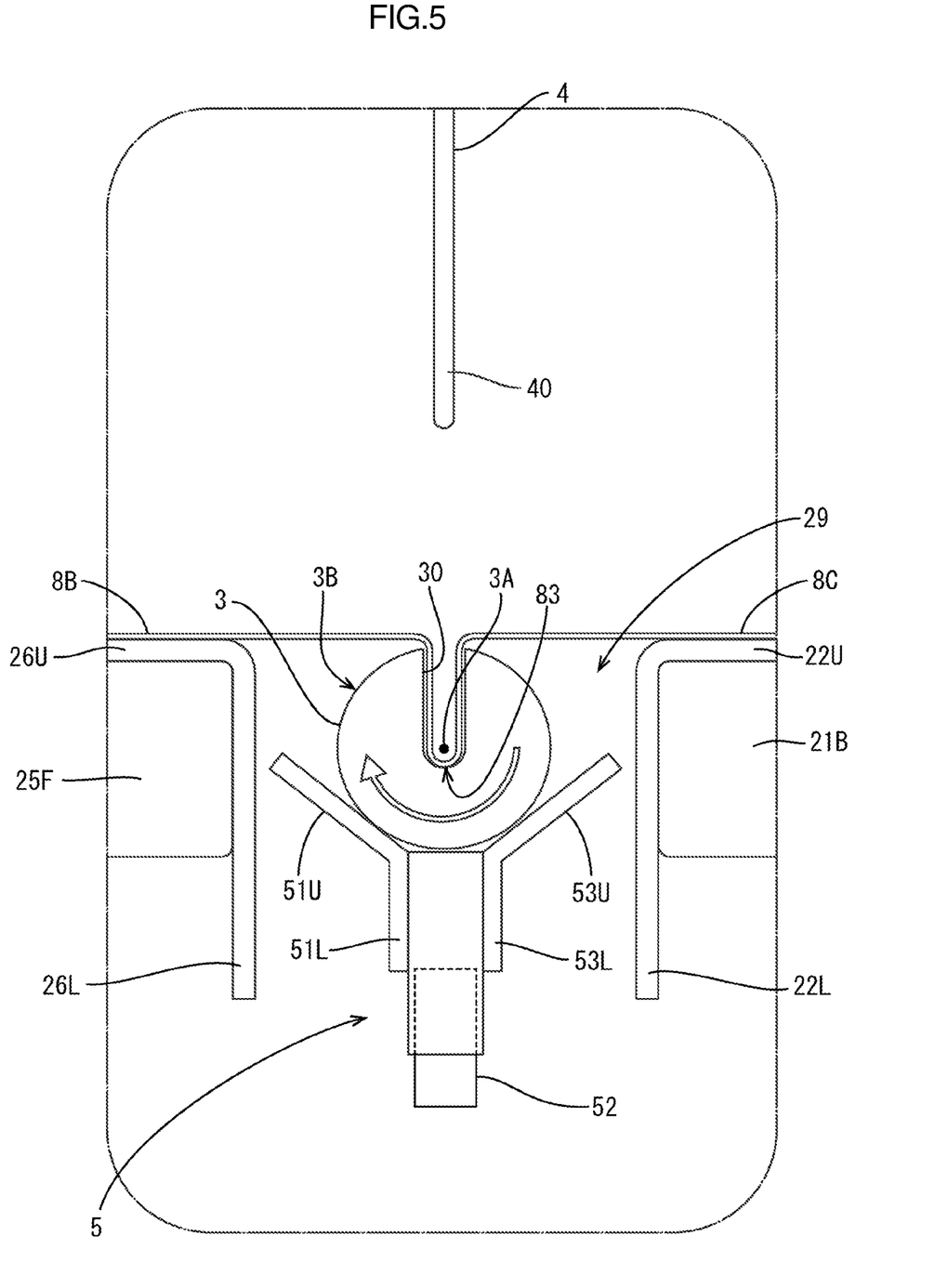
FIG. 5 is a side view of the portion of the wind-up device in which the insertion section is removed from the groove.
Figure 6:
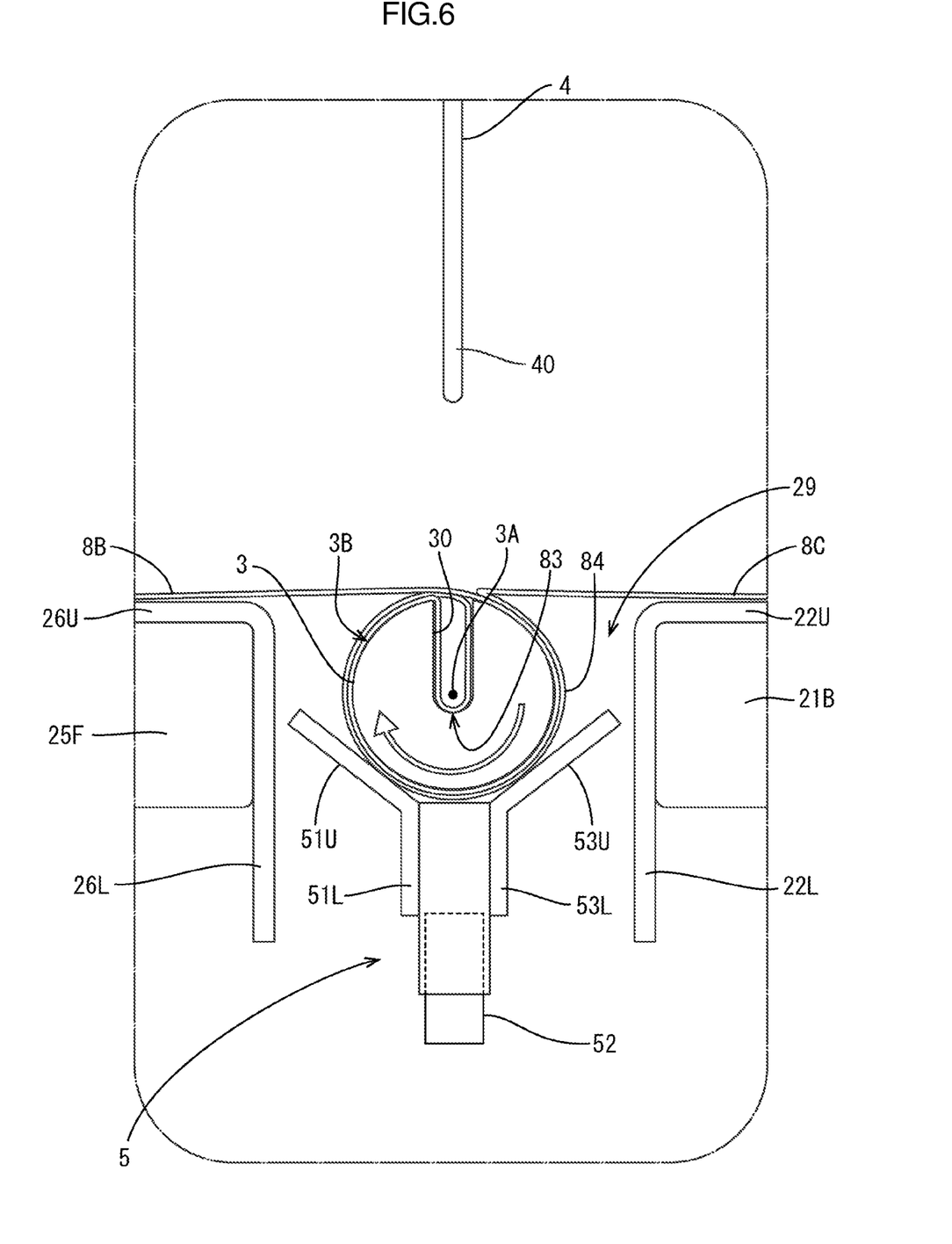
FIG. 6 is a side view of the portion of the wind-up device after a first rotation of the bar.

Then, as illustrated in FIG. 5, the controller 6 controls the upper movable member 4 to move upward and away from the groove 30. This removes the insertion section 40 from the groove 30. Then, the controller 6 controls the motor included in the left support portion 39 to rotate the bar 3 around the center axis 3A one time in a clockwise direction seen from the left support portion 39 (in a direction designated by an arrow in FIG. 5). This rotation of the bar 3 is a first rotation. The rotation angle of one rotation of the bar 3 is 360 degrees. After the first rotation, as illustrated in FIG. 6, the airbag 8 is wound around the surface 3B of the bar 3 one time. In this state, a wound portion 84 of the airbag 8 that is wound around the bar 3 includes a first portion of the front section 8C and a first portion of the rear section 8B that are next to the center line 83 and overlapped. The wound portion 84 includes two portions of the airbag 8 that overlap each other. The front guide 51 and the rear guide 53 are contacted with and pressed toward the wound portion 84 by the urging member 52. The front guide 51 and the rear guide 53 may be away from the wound portion 84 with a small distance.

Figure 7:
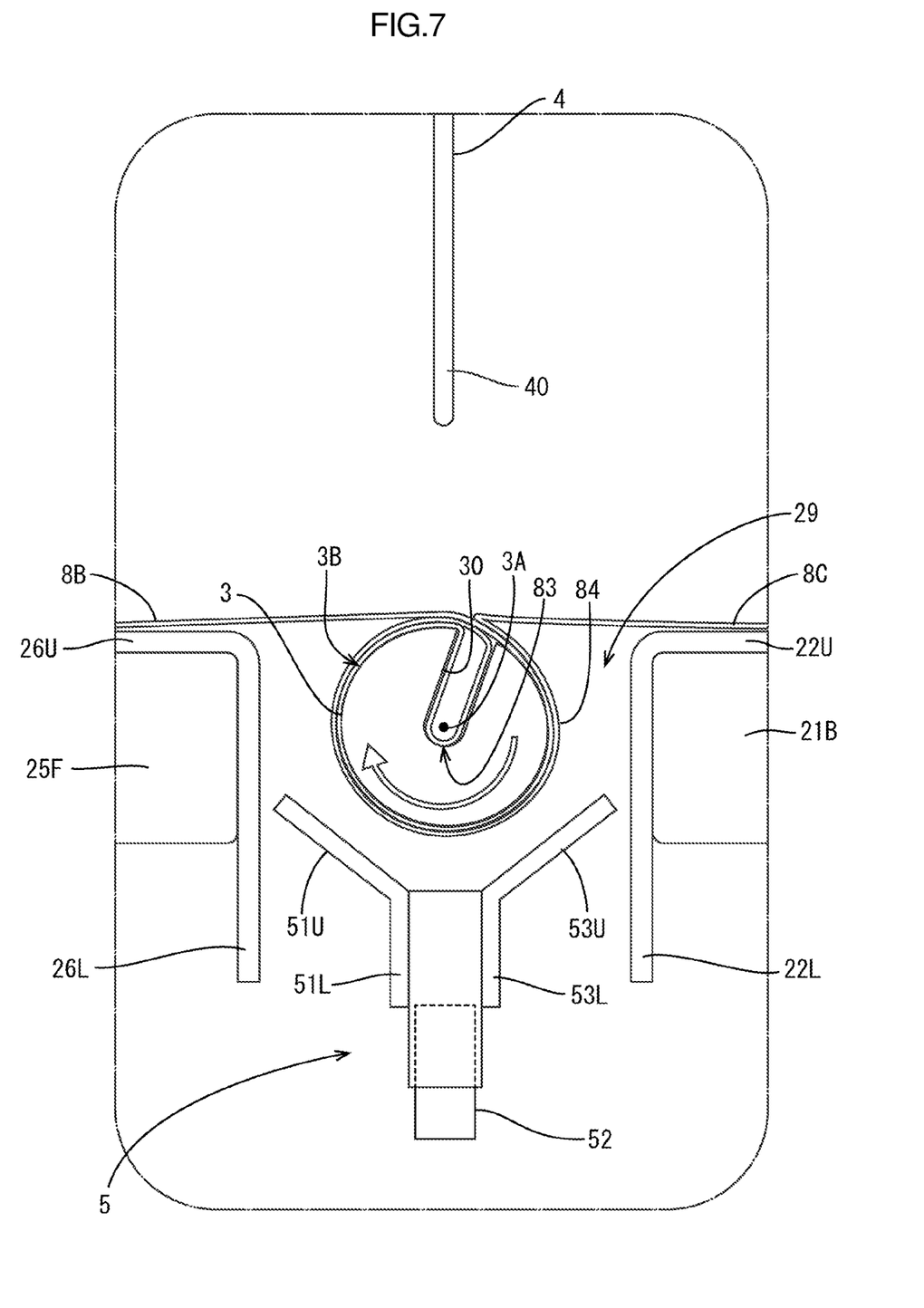
FIG. 7 is a side view of the portion of the wind-up device in which a lower movable member is away from the bar.

As illustrated in FIG. 7, the controller 6 subsequently controls the motor to rotate the bar 3 one more time in the clockwise direction. This rotation of the bar 3 is a second rotation. In response to starting of the second rotation, the airbag 8 is wound around the surface 3B of the bar 3 second time. After starting of the second rotation of the bar 3, the controller 6 controls the lower movable member 5 to move downward to be away from the bar 3. Specifically, the controller 6 controls the lower movable member 5 to be away from the bar 3 when the bar 3 is rotated at 15 degrees around the center axis 3A from the state before the starting of the rotation of the bar 3 and the opening of the groove 30 faces upward. However, the lower movable member 5 may be moved away from the bar 3 at any time after starting of the second rotation of the bar 3. The controller 6 may control the lower movable member 5 to move downward in response to starting of the second rotation of the bar 3. The controller 6 controls the lower movable member 5 to move downward by 5 mm from an initial position of the lower movable member 5 before the end of the second rotation.

Figure 8:
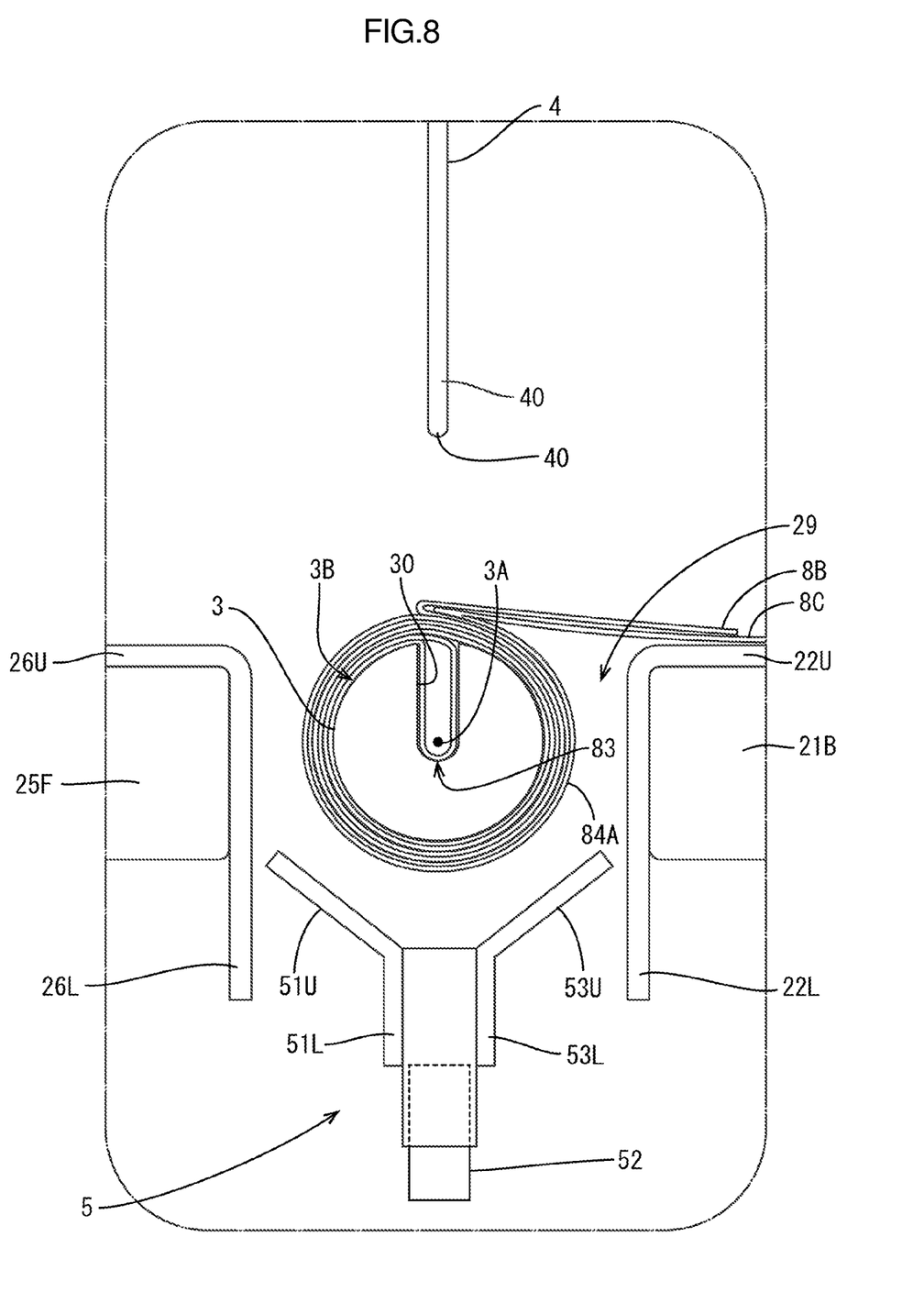
FIG. 8 is a side view of the portion of the wind-up device after a third rotation of the bar.
Figure 9:
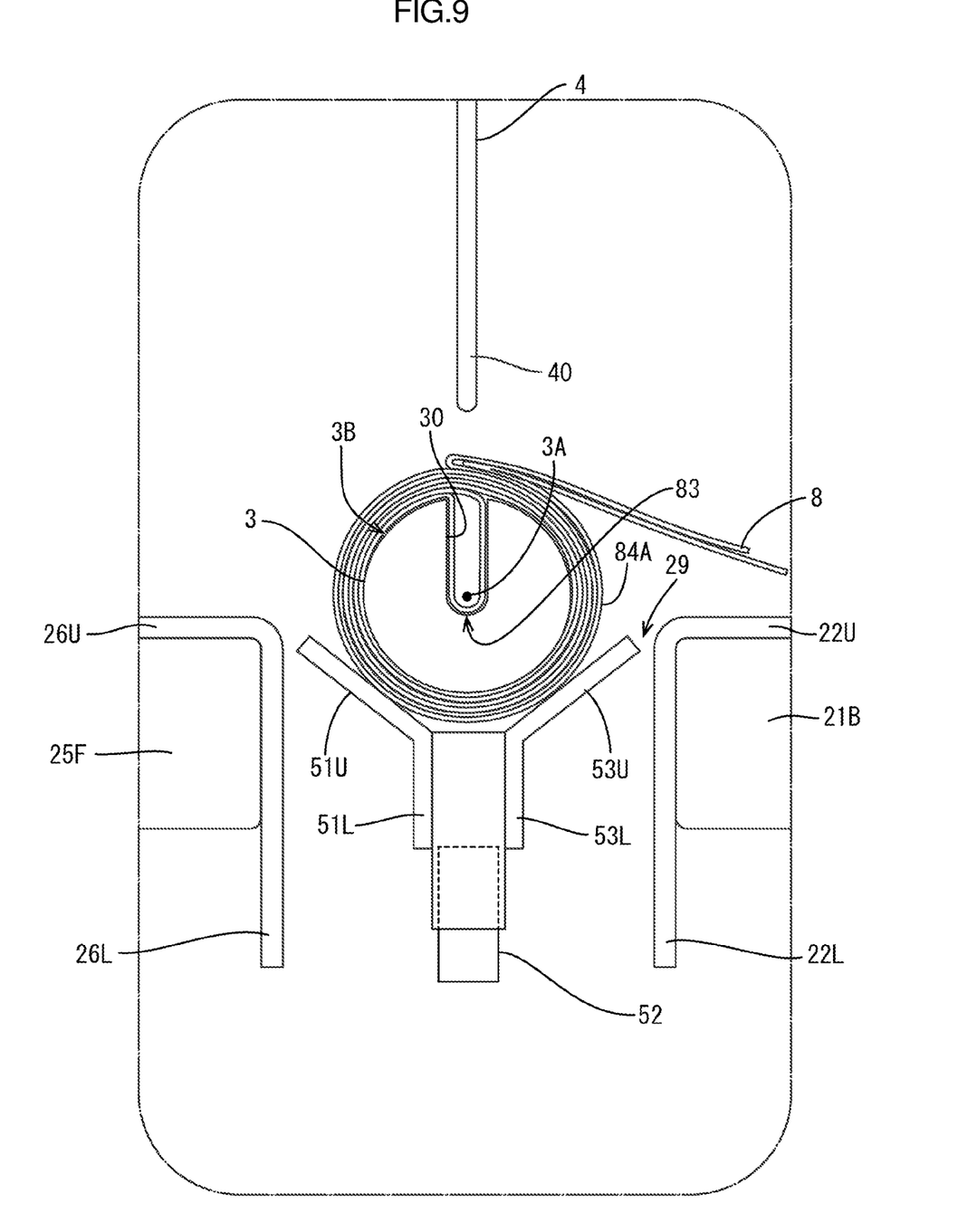
FIG. 9 is a side view of the portion of the wind-up device in which the bar is moved upward by the lower movable member.

Subsequently, the controller 6 controls the motor to rotate the bar 3 one more time to wind the airbag 8 around the surface 3B of the bar 3. This is a third rotation. As illustrated in FIG. 8, after the third rotation, a wound portion 84A of the airbag 8 that is wound around the bar 3 three times includes the first portion, a second portion, and a third portion of the front section 8C and the first portion, a second portion, and a third portion of the rear section 8B that are overlapped. The wound portion 84A includes six portions of the airbag 8 that overlap each other. Then, the controller 6 controls the lower movable member 5 to move upward such that the front guide 51 and the rear guide 53 come in contact with the wound portion 84A and push the bar 3 upward. As illustrated in FIG. 9, the bar 3 and the wound portion 84A of the airbag 8 wound around the bar 3 are out of the housing section 29. This completes the winding-up of the airbag 8 with the bar 3. If an airbag having greater length in the short side direction than the airbag 8 is wound around the bar 3 in the wind-up device 1, the number of rotations of the bar 3 is increased.

Figure 10:
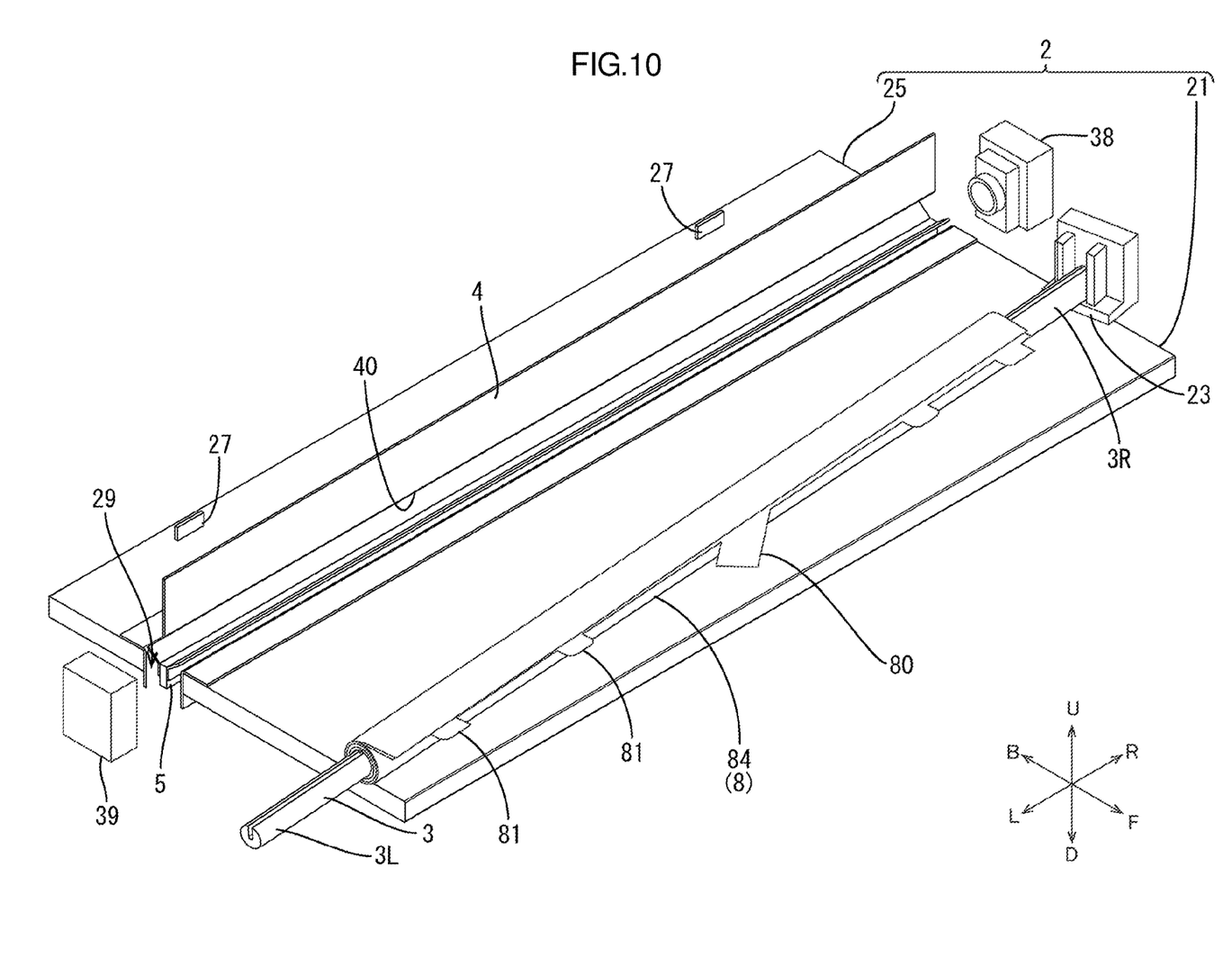
FIG. 10 is a perspective view of the wind-up device in which the bar and the airbag wound around the bar are removed from the housing section.

After finishing of the winding-up of the airbag 8, as illustrated in FIG. 10, the bar 3 is removed from the right support portion 38 and the left support portion 39. Then, with the right end 3R of the bar 3 being put in and held by the clamp 23, the airbag 8 is slid along the bar 3 in the longitudinal direction toward the left end 3L and separated from the bar 3.

Next, advantageous effects of the present embodiment will be described. In this embodiment, the wind-up device 1 includes the base 2, the bar 3, and the upper movable member 4. The base 2 has an elongated shape and includes the first base member 21 and the second base member 25 on which the airbag 8 is placed. The base 2 further includes the housing section 29 between the first base member 21 and the second base member 25. The housing section 29 extends in the longitudinal direction of the base 2. The bar 3 is arranged in the housing section 29 and the center axis 3A of the bar 3 extends in the longitudinal direction. The bar 3 is rotatable around the center axis 3A. The upper movable member 4 extends along the bar 3 in the longitudinal direction and is movable relative to the bar 3. The bar 3 includes the groove 30 that is recessed from the surface 3B of the bar 3 toward the center axis 3A and extends in the longitudinal direction. The upper movable member 4 includes the insertion section 40 that is to be inserted in the groove 30 together with a portion of the airbag 8 that is disposed above the housing section 29.

According to the wind-up device 1, the portion of the airbag 8 is pushed by the insertion section 40 and inserted in the groove 30 and the bar 3 is rotated with the portion of the airbag 8 being in the groove 30 to wind up the airbag 8 around the bar 3. Accordingly, the airbag 8 is less likely to be moved from the correct position and wrinkled when the airbag 8 is wound up and the airbag 8 is wound up promptly.

The wind-up device 1 includes the lower movable member 5 that is arranged on an opposite side from the upper movable member 4 relative to the bar 3. The lower movable member 5 is movable relative to the bar 3 and can be moved away from the bar 3. The lower movable member 5 includes the guide 50 that extends in the longitudinal direction along a portion of the surface 3B of the bar 3.

According to the wind-up device 1, the airbag 8 may be moved from the correct position or wrinkled when being wound around the bar 3. Even in such a case, the bar 3 is rotated while the airbag 8 is being contacted with the guide 50 and sandwiched between the guide 50 and the bar 3 and this corrects the position of the airbag 8 and stretches the wrinkles. When the airbag 8 is wound around the bar 3 several times, the lower movable member 5 is moved away from the bar 3 to adjust the contact pressure of the guide 50 against the airbag 8.

The wind-up device 1 further includes the controller 6 that is configured to control the rotation of the bar 3 and the movement of the lower movable member 5. The controller 6 controls the lower movable member 5 to move away from the bar 3 when the bar 3 is rotated two times or more around the center axis 3A. According to the wind-up device 1, the airbag 8 is wound around the bar 3 accurately and promptly.

The lower movable member 5 includes the urging member 52 that urges the guide 50 toward the bar 3. According to the wind-up device 1, the airbag 8 is wound around the bar 3 more accurately.

The bar 3 has a diameter that decreases as the bar 3 extends in the longitudinal direction to one end of the bar 3. According to the wind-up device 1, the airbag 8 wound around the bar 3 can be easily separated from the bar 3 by pulling the airbag 8 from the one end.

The base 2 includes the positioning members 27 that are to be contacted with the airbag 8 that is placed on the first base member 21 and the second base member 25 such that the center line 83 of the airbag 8 relative to a direction perpendicular to the longitudinal direction is above the housing section 29.

According to the wind-up device 1, the middle section of the airbag 8 including the center line 83 can be inserted in the groove 30. Accordingly, the airbag 8 is folded along the center line 83 in the groove 30 and wound around the bar 3. The airbag 8 is wound up promptly and easily.

The width of the groove 30 is four times or more as the thickness of the insertion section 40. According to the wind-up device 1, the portion of the airbag 8 is inserted in the groove 30 and wound around the bar 3 properly.

OTHER EMBODIMENTS

The present disclosure is not limited to the embodiment described above and illustrated in the drawings. The following embodiments may be included in the technical scope of the technology described herein. The technology described herein may be modified within the technical scope.

The housing section may be a recess in a base. The recess may be recessed downward in the base and extend in the longitudinal direction.

The wind-up device may be used for winding up various airbags such as a front airbag and a side airbag. The wind-up device may be installed in various vehicles such as a train and an airplane.

The invention claimed is:

1. A wind-up device for winding up a vehicular airbag, the wind-up device comprising:
   a base having an elongated plate shape that extends in a first direction and including a housing section that extends in the first direction, the base on which the vehicular airbag is placed;
   a bar disposed in the housing section and having a center axis that extends in the first direction, the bar being rotatable around the center axis, the bar including a groove extending in the first direction and being recessed from an outer surface of the bar toward the center axis; and a first movable member extending in the first direction along the bar and being movable to be closer to the bar, the first movable member including an insertion section that is to be inserted into the groove together with a portion of the airbag that is above the housing section.

2. The wind-up device according to claim 1, further comprising a second movable member disposed on an opposite side from the first movable member relative to the bar and being movable to be away from the bar, the second movable member including a guide that extends in the first direction along the outer surface of the bar.

3. The wind-up device according to claim 2, wherein the second movable member includes an urging member that urges the guide toward the bar.

4. The wind-up device according to claim 1, wherein the bar has a diameter that decreases as it extends in the first direction from one end to another end.

5. The wind-up device according to claim 1, further comprising a positioning member that projects from the base and is contacted with a long edge of the airbag such that a middle section of the airbag relative to a second direction that is perpendicular to the first direction is above the housing section.

6. The wind-up device according to claim 1, wherein the groove has a width measuring in a second direction perpendicular to the first direction, the width of the groove is four times or more as a thickness of the insertion section.

7. The wind-up device according to claim 5, wherein a distance from the positioning member to the center axis of the bar in the second direction is the same as a half of a width of the airbag measuring in the second direction.

8. The wind-up device according to claim 1, wherein the groove has a depth measuring in a radial direction of the bar and the depth is greater than a distance from the outer surface of the bar to the center axis.

9. The wind-up device according to claim 1, wherein the insertion section extends in the first direction and has a length measuring in the first direction and the length of the insertion section is the same as or greater than a length of the airbag measuring in the first direction.

10. The wind-up device according to claim 1, wherein an uppermost section of the outer surface of the bar is on a same level as an upper surface of the base.

11. The wind-up device according to claim 1, wherein the bar has an elongated circular columnar shape.

* * * * *